R. E. LAIRD & J. H. RANEY.
PROCESS OF TREATING PETROLEUM EMULSIONS.
APPLICATION FILED JULY 22, 1914.
1,116,299.
Patented Nov. 3, 1914.
2 SHEETS—SHEET 1.
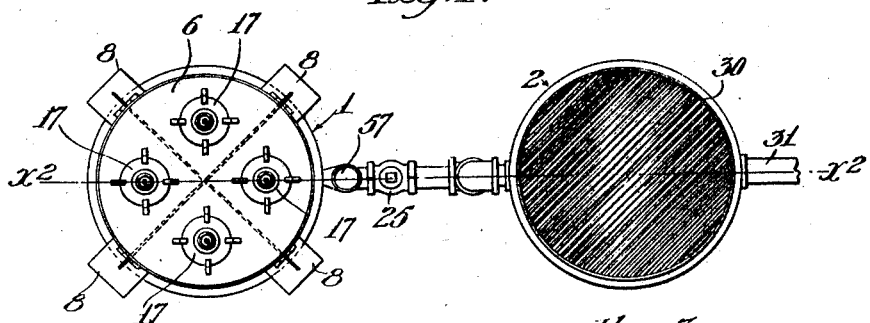
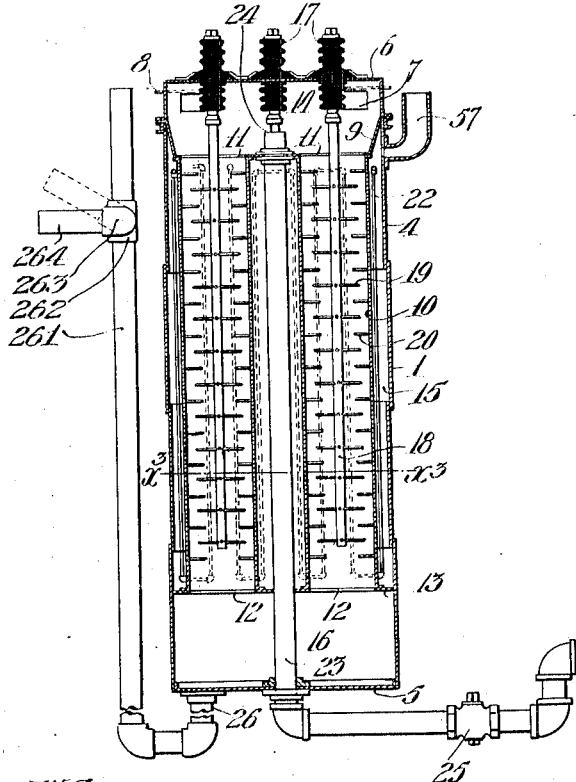
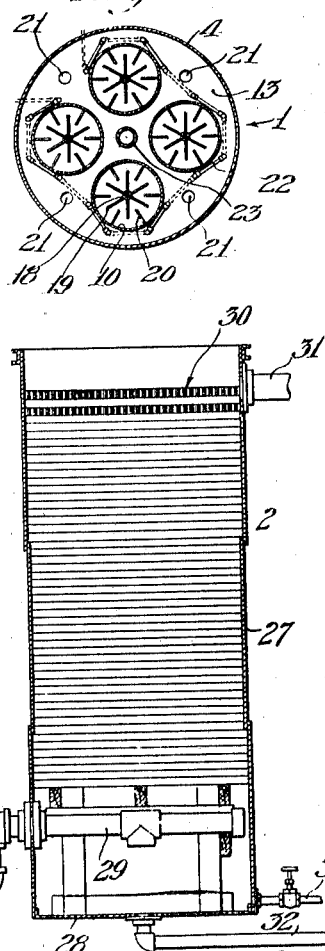

R. E. LAIRD & J. H. RANEY.
PROCESS OF TREATING PETROLEUM EMULSIONS.
APPLICATION FILED JULY 22, 1914.
1,116,299.                                                     Patented Nov. 3, 1914.
2 SHEETS—SHEET 2.
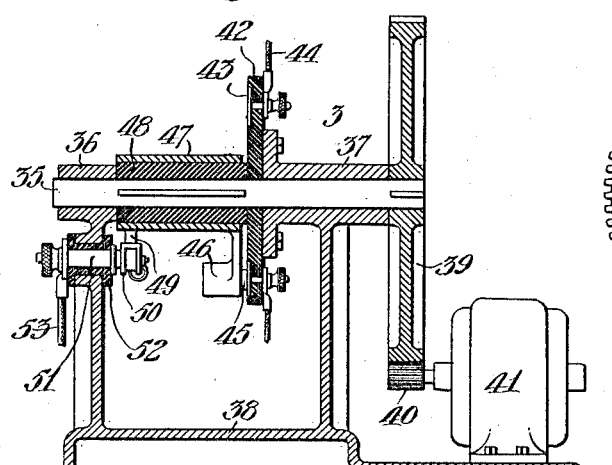
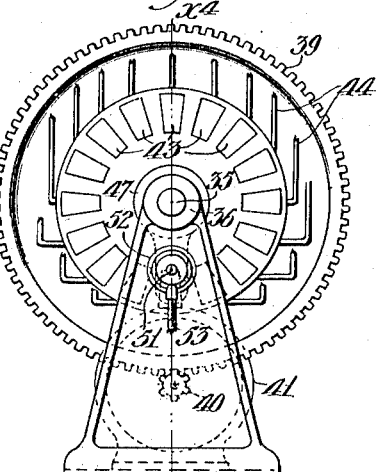
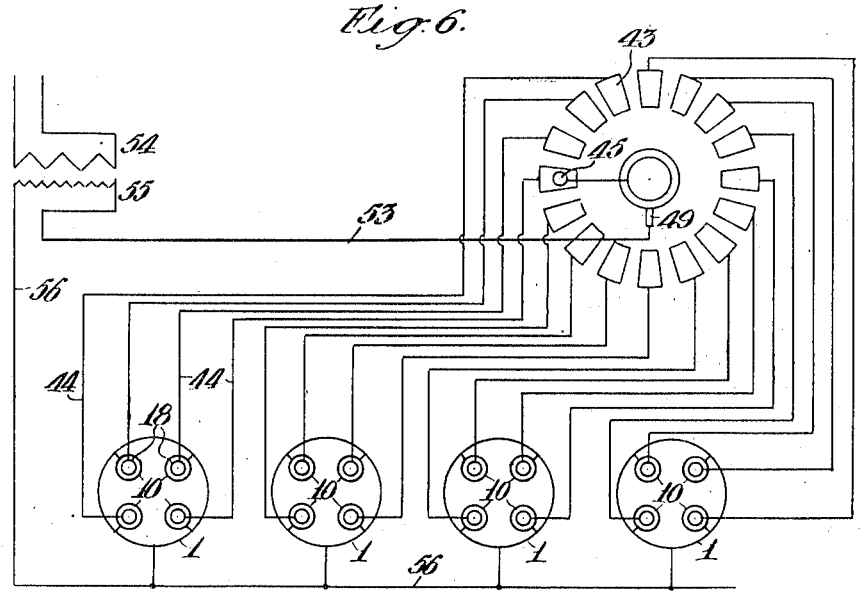
Witnesses:—
Inventors
Robert E. Laird
Joseph H. Raney

UNITED STATES PATENT OFFICE.

ROBERT E. LAIRD AND JOSEPH H. RANEY, OF TAFT, CALIFORNIA.

PROCESS OF TREATING PETROLEUM EMULSIONS.

1,116,299.  Specification of Letters Patent.  Patented Nov. 3, 1914.

Application filed July 22, 1914. Serial No. 852,481.

*To all whom it may concern:*

Be it known that we, ROBERT E. LAIRD and JOSEPH H. RANEY, citizens of the United States, both residing at Taft, in the county of Kern, State of California, have invented a new and useful Process of Treating Petroleum Emulsions.

Our invention relates to means for removing water and other impurities from oil, and more particularly from petroleum oils.

In the practical production and transportation of crude petroleum water is often introduced into the oil. This water may be in the form of large globules which will settle out if the mixture is allowed to stand, such water being known as "free water." On the other hand the water may be present in small particles forming an emulsion with the oil which will not separate into its component parts even if allowed to stand for long periods of time. The water in such an emulsion is known as "trapped water."

The problem of removing this trapped water is a common one, and the principal object of our invention is to provide a process for economically separating this trapped water from the body of the oil. There have already been devised various processes for doing this, and particularly there have been devised certain processes in which electricity has been used, the water particles being lined up between charged electrodes and the separating walls of oil between the particles being punctured by the electric current to produce a coalescence of the minute particles of trapped water into larger globules of free water. Previous inventors have regarded the formation of such chains as a disadvantage and have worked out various means for preventing the formation of such chains by the rotation of the electrodes or the emulsion. We have found that the formation of chains is absolutely necessary to the proper operation of our apparatus and that the current through the chains must be maintained for an appreciable time to cause a proper treatment of the oil.

A further object of our invention is to supply and maintain a sufficient electrical potential to positively form such chains and to maintain heavy short circuit currents through the emulsion. It is, of course, obvious that after a proper coalescence of the small particles takes place that there is no utility in maintaining such heavy or short circuit currents. We find that it is necessary to first allow a heavy current to pass through the chains and then to entirely interrupt the current and allow the particles of trapped water to coalesce and concentrate into larger globules of free water.

A further object of our invention is to provide positive means external to the treater proper for interrupting the current at regular intervals for the purpose of allowing a thorough coalescence of the trapped water particles into free water globules.

Previous inventors have also laid considerable stress on the downward movement of the emulsion between the electrodes so that the movement of the emulsion is in the same direction as the movement of the free water globules under the action of gravity. This has necessitated the introduction of the emulsion at the top of the treater and the removal of the cleaned and separated liquid at the bottom of the treater. The introduction of the emulsion at the top of the treater has resulted in a great deal of trouble due to heavy currents flowing over the surface of the emulsion, the emulsion being a poor insulator and various schemes have been devised for preventing such leakage currents on the surface of the emulsion. We have found that by admitting the emulsion to the bottom of the treater and passing it upwardly between the electrodes that we obtain a natural separation of the oil and water, the water falling and the oil rising under the action of gravity, and that we are able to maintain a large body of cleaned oil at the surface of our treater, thus doing away in a large measure with insulation troubles. By passing the emulsion slowly upwardly and allowing a portion of the globules of free water to settle downwardly through the rising emulsion we are able to cause a mechanical coalescence of the trapped water particles with such globules in their downward course. We find further that at the instant the short circuit current flows that the resistance between the electrodes is greatly reduced and the voltage across the electrodes is lowered. It is therefore desirable to apply this voltage to only one treater at a time, as if the treaters are connected in groups all the work is done in the treater having the lowest initial resistance, the other treaters being idle due to insufficient voltage.

A further object of our invention is to provide a distributer which will impress the high voltage on one treater at a time and which will allow sufficient time intervals in each treater between treatments to allow the freed water to coalesce into large globules.

Our invention consists broadly of a process for producing and maintaining heavy short circuit currents through an emulsion. The source of supply is made strong enough to cause such currents to flow even through widely variable qualities of emulsion and strong enough to hold the short circuit until broken by means external to the treater, even if caused in a moving emulsion. It is widely different from any process in which a critical voltage is applied, this critical voltage being strong enough to start a flow of current from electrode to electrode but not sufficiently strong to maintain the flow as the emulsion is twisted or the electrode is moved. One of the principal reasons for the high efficiency of our process is the positive nature of the short circuit currents which we impress upon the oil.

The invention further consists of a process in which the emulsion moves upwardly between the electrodes which have a suitable electrical potential difference maintained on them. This upward movement of the emulsion results in a natural separation of the cleaned oil from the water which in a great measure settles out and is removed from the bottom of the treater. The small portion of free water that is carried over with the oil is subsequently removed in a special form of separator.

Further objects and advantages will be evident hereinafter.

Referring to the drawings, which are for illustrative purposes only: Figure 1 is a plan view of a treater and a separator. Fig. 2 is a partial section on the plane $x^2-x^2$ of Fig. 1. Fig. 3 is a section on the plane $x^3-x^3$ of Fig. 2. Fig. 4 is an end view of the interrupter and distributer. Fig. 5 is a partial section on the plane $x^4-x^4$ of Fig. 4. Fig. 6 is a diagram of connections.

The invention broadly considered consists of a treater 1, a separator 2, and a distributing interrupter 3. The treater consists of a cylindrical outer shell 4 having a tight bottom 5 and a top 6 provided with gas relief apertures 7 which may be closed by suitable doors 8. A pan 9 is tightly secured in the top of the shell 1. Four cylindrical outer electrodes 10 are tightly secured in openings 11 formed in the pan 9 extending downwardly and having their lower ends secured in four openings 12 formed in a dividing plate 13. The pan 9 and the plate 13 divide the interior of the treater into three chambers, an upper chamber 14, a central chamber 15, and a lower chamber 16. The outer electrodes 10 form open passages between the chambers 14 and 16, passing through the chamber 15. Supported in insulators 17 on the top 6 are four inner electrodes 18, each of these electrodes extending downwardly through the center of one of the outer electrodes 10. A series of points 19 project outwardly from the inner electrodes 18 and a similar series of points 20 project inwardly from the outer electrodes 10. The plate 13 is provided with four holes 21 which provide an open communication between the chambers 15 and 16. A series of heating coils 22 are provided in the chamber 15 being fed with steam or other heated fluid from a source not shown. A central outlet pipe 23 extends upwardly through the bottom 5 through the plate 13 and through the pan 9 forming a tight closure with all these parts and extending upwardly as shown at 24 inside the pan 9. This pipe 23 communicates through a valve 25 with the separator 2. A water outlet pipe 26 is provided in open communication with the bottom of the treater. This water outlet pipe is extended downwardly to a considerable distance below the treater and connects with a vertical pipe 261, which extends upwardly and communicates through a T 262 and an elbow 263 with a movable pipe 264.

The separator 2 consists of a tight tank 27 provided with a bottom 28 and with an inlet pipe 29 which is in open communication with the pipe 23 through the valve 25. A series of wooden lath members 30 are provided in the separating tank for the purpose of collecting and trapping that portion of the free water which passes into the separator 27 with the oil from the treater 1. An outlet pipe 31 is provided for drawing off the cleaned oil from the separator and an outlet pipe 32 is provided for drawing off the water from the separator. A blow-out pipe 34 is provided on the separator 2 to admit water or steam for the purpose of cleaning the interior of the separator.

The interrupter 3, shown in Figs. 4 and 5, consists of a shaft 35 turning in bearings 36 and 37 formed on a bed plate 38 and driven by a gear 39 which is driven by a pinion 40 on the shaft of a motor 41 which may be driven from any convenient source of electrical energy. Mounted on the bearing 37 is an insulating plate 42 on which are mounted a plurality of stationary contacts 43 each connected to a wire 44. A rotating brush 45 is carried on a rotating brush holder 46 which is formed integral with a sleeve 47. The sleeve 47 is carried on an insulating bushing 48 mounted on the shaft 35. A stationary brush 49 presses against the sleeve 47 being carried in a brush holder 50 supported on a brush holder stud 51 provided with suitable insulation 52 and connected to a wire 53.

The method of connecting the apparatus is shown in Fig. 6. A transformer is provided having a primary winding 54 and a secondary winding 55. One side of the secondary winding 55 connects through the wire 53 with the stationary brush 49. The other side of the secondary winding 55 connects through a wire 56 with the tanks 1, each of these tanks being connected to the outer electrodes 10. Each of the inner electrodes 18 is connected through a wire 44 with one of the segments 43 on the insulating plate 42. One of these segments is connected through the brush 45 and the sleeve 47 with the wire 53. As the shaft 35 is rotated an electrical potential is impressed on each pair of inner and outer electrodes in turn, the current flowing from the secondary 55 through the wire 53 to the brush 49 and into the sleeve 47. From the sleeve 47 it flows through the brush 45 to one of the segments 43 and from the segment 43 through the brush 44 to an inner electrode 18. The current then flows through the emulsion to one of the outer electrodes 10 and from thence through the wire 56 back to the other side of the secondary 55.

The method of operation of the invention is as follows: Emulsion is admitted to the treater 1 through an inlet pipe 57 into the top of the chamber 15 just below the pan 9. This emulsion flows downwardly through the chamber 15, being acted upon if desired by the heating coils 22 and passing out of the chamber 15 into the chamber 16 through the holes 21. We have found that the natural tendency of the free water to settle is assisted by heating the emulsion, thereby reducing its viscosity. Only the heavier oils need to be so heated. The emulsion then rises through the outer electrodes 10 and between the points 19 and 20 formed on the outer and inner electrodes. When an electrical potential exists between these electrodes an electric field is set up and the particles of trapped water arrange themselves in chains between the electrodes. The potential is maintained sufficiently high to positively cause a puncturing of the oil between the different particles so that there is a coalescence of the various water particles into one long practically continuous chain of water. The speed of the shaft 35 is made such that the current is allowed to flow for a considerable interval after this chain is formed and a thorough coalescence takes place. The current is then interrupted for a longer period by the movement of the brush 45 and the chain forms one or more large water globules which drop through the moving body of emulsion into the chamber 16. As the water globules pass downwardly they collect many small particles of trapped water which they coalesce with to form larger bodies of free water. The length of the pipes 26 and 261 is made such that the movable column of oil in the treater and a column of water in the pipe 26 are exactly balanced by a column of water in the pipe 261. Whenever water collects in the chamber 16 the weight in the treater and the pipe 26 exceeds the weight in the pipe 261 and water flows from the pipe 26 into the pipe 261 until a balanced condition exists. The pipe 264 is turned to adjust the vertical height of the column in the pipe 261 so that the water level for a balanced condition will be low in the chamber 16 or even a considerable distance down in the pipe 26. In practice a continuous stream of water flows from the pipe 264 thus relieving the chamber 16 of free water. A small proportion of the smaller water globules and a small percentage of emulsion may be carried upwardly with the rising stream of cleaned oil and the mixture is delivered to the pan 9, the liquid in this pan consisting almost wholly of cleaned oil. This oil and small proportion of water passes downwardly through the pipe 23 through the valve 25 and the pipe 29 into the bottom of the separator 27, rising slowly through the lath members 30 which have previously been thoroughly wetted with water. The large surface presented by the lath members catches and retains the small proportion of free water in the mixture, and this water trickles down into the bottom of the separator 2 and is withdrawn through the pipe 32, the cleaned oil practically free from emulsion passing outwardly through the pipe 31.

We claim as our invention:—

1. The improvement in the art of breaking up emulsions which consists in impressing on the emulsion a sufficient electrical potential difference to arrange the conducting particles in chains, maintaining a sufficient electrical potential difference to cause heavy short circuit currents to flow through said chains, and interrupting said currents at regular intervals to allow the chains to coalesce into free water.

2. The improvement in the art of treating emulsions of oil and water which consists in subjecting said emulsions to an electrical strain sufficient to aline the water particles in chains and positively break down the walls between the particles, maintaining such strains during a period sufficient to produce a complete coalescence of such particles, and discontinuing such strains for a period sufficient to allow the breaking up of such chains into globules of free water.

3. The process of treating emulsions which consists in passing such emulsions between electrodes, maintaining a sufficient electrical potential difference between such electrodes to produce chains of conducting particles and to produce heavy short circuit currents in such chains, and interrupting such currents for sufficient periods to allow such conducting particles to form large globules of free water.

4. The process of treating emulsions of petroleum oil and water which consists in passing the emulsion upwardly between suitable electrodes and intermittently impressing upon these electrodes a voltage sufficiently high to produce chains of water between the electrodes and to coalesce the chains by heavy short circuit currents.

5. The process of treating emulsions of petroleum oil and water which consists in subjecting the emulsion to an electrical stress for a sufficiently long time to produce heavy currents through the water particles therein and interrupting this current to allow the coalesced particles to form globules of free water.

In testimony whereof, we have hereunto set our hands at Los Angeles, California, this 15th day of July, 1914.

ROBERT E. LAIRD.
JOSEPH H. RANEY.

In presence of—
   FRED A. MANSFIELD,
   FORD W. HARRIS.